United States Patent
Chen et al.

(10) Patent No.: US 7,839,626 B2
(45) Date of Patent: Nov. 23, 2010

(54) DISPLAY STRUCTURE

(75) Inventors: Yun-Lung Chen, Taipei Hsien (TW); Zhong-Hai Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 193 days.

(21) Appl. No.: 12/335,619

(22) Filed: Dec. 16, 2008

(65) Prior Publication Data

US 2010/0128425 A1   May 27, 2010

(30) Foreign Application Priority Data

Nov. 25, 2008   (CN) ..................... 2008 20 302913

(51) Int. Cl.
  *G06F 1/16* (2006.01)
(52) U.S. Cl. ................. 361/679.07; 248/917
(58) Field of Classification Search ........... 361/679.07, 361/679.21, 679.22; 248/917
  See application file for complete search history.

(56) References Cited

U.S. PATENT DOCUMENTS

| | | | |
|---|---|---|---|
| 5,870,280 A * | 2/1999 | Cho ...................... | 361/679.07 |
| 6,510,049 B2 * | 1/2003 | Rosen ................... | 361/679.07 |
| 7,424,994 B2 * | 9/2008 | Jeong ..................... | 248/278.1 |
| 7,593,218 B2 * | 9/2009 | Hwang et al. .......... | 361/679.21 |
| 7,595,978 B2 * | 9/2009 | Chen et al. ............ | 361/679.06 |
| 7,637,463 B2 * | 12/2009 | Yen et al. ................ | 248/157 |
| 7,643,276 B2 * | 1/2010 | Shin ...................... | 361/679.06 |
| 7,712,711 B2 * | 5/2010 | Jang ....................... | 248/125.8 |
| 7,748,680 B2 * | 7/2010 | Choi ....................... | 248/371 |
| 7,766,288 B2 * | 8/2010 | Kim et al. ............... | 248/176.1 |
| 2005/0254203 A1 * | 11/2005 | Choi et al. ............. | 361/681 |
| 2006/0187625 A1 * | 8/2006 | Jung et al. .............. | 361/681 |
| 2006/0203436 A1 * | 9/2006 | Hwang et al. ......... | 361/679 |
| 2006/0238966 A1 * | 10/2006 | Sung ...................... | 361/681 |
| 2007/0008686 A1 * | 1/2007 | Jang ........................ | 361/681 |
| 2007/0121280 A1 * | 5/2007 | Yang ....................... | 361/681 |
| 2008/0043411 A1 * | 2/2008 | Chih et al. .............. | 361/681 |
| 2009/0201661 A1 * | 8/2009 | Kim ....................... | 361/829 |
| 2010/0061041 A1 * | 3/2010 | Chen .................... | 361/679.01 |
| 2010/0149438 A1 * | 6/2010 | Chen et al. ............ | 348/836 |

* cited by examiner

*Primary Examiner*—Lisa Lea-Edmonds
(74) *Attorney, Agent, or Firm*—Clifford O. Chi

(57) ABSTRACT

A display structure includes a base, a stand pivotably attached to the base and rotatable along a first axis, an elastic connecting member, and a display unit pivotably engaged with ends of the connecting member and rotatable along a second axis substantially perpendicular to the first axis. The connecting member includes a pair of arm sections slidably engaged with the stand for adjusting a height of the display unit.

15 Claims, 5 Drawing Sheets

DISPLAY STRUCTURE

BACKGROUND

1. Technical Field

The present disclosure relates to display structures and, more particularly, to a display structure with an adjustable supporting device.

2. Description of Related Art

As computer display technology develops, monitors are being developed that are smaller in volume and lighter in weight. A typical adjusting device is assembled thereon to adjust the angle and the height of the monitor.

A typical adjusting device includes a connecting board secured to a back of a monitor, a plate secured to a supporting board, and an active device and a passive device secured to the connecting board and pivotably attached to the plate. The active device is assembled on the plate and can drive the passive device. The connecting board is driven by the passive device to rotate around the supporting board to adjust the horizontal orientation of the monitor. However, the adjusting device cannot adjust the height of the monitor.

Another typical adjusting device includes a base and a supporting arc-shaped structure. The supporting structure is assembled on the base and extends upwardly from the base. A guide groove is formed on the upper surface of the supporting structure. The monitor can slide in the guide groove and be fastened at different locations to adjust the angle of the monitor. However, the monitor has a fixed height and horizontal orientation.

Thus, an adjusting device which overcomes the above-mentioned problems is desired.

DETAILED DESCRIPTION OF THE EMBODIMENTS

Figure 1:
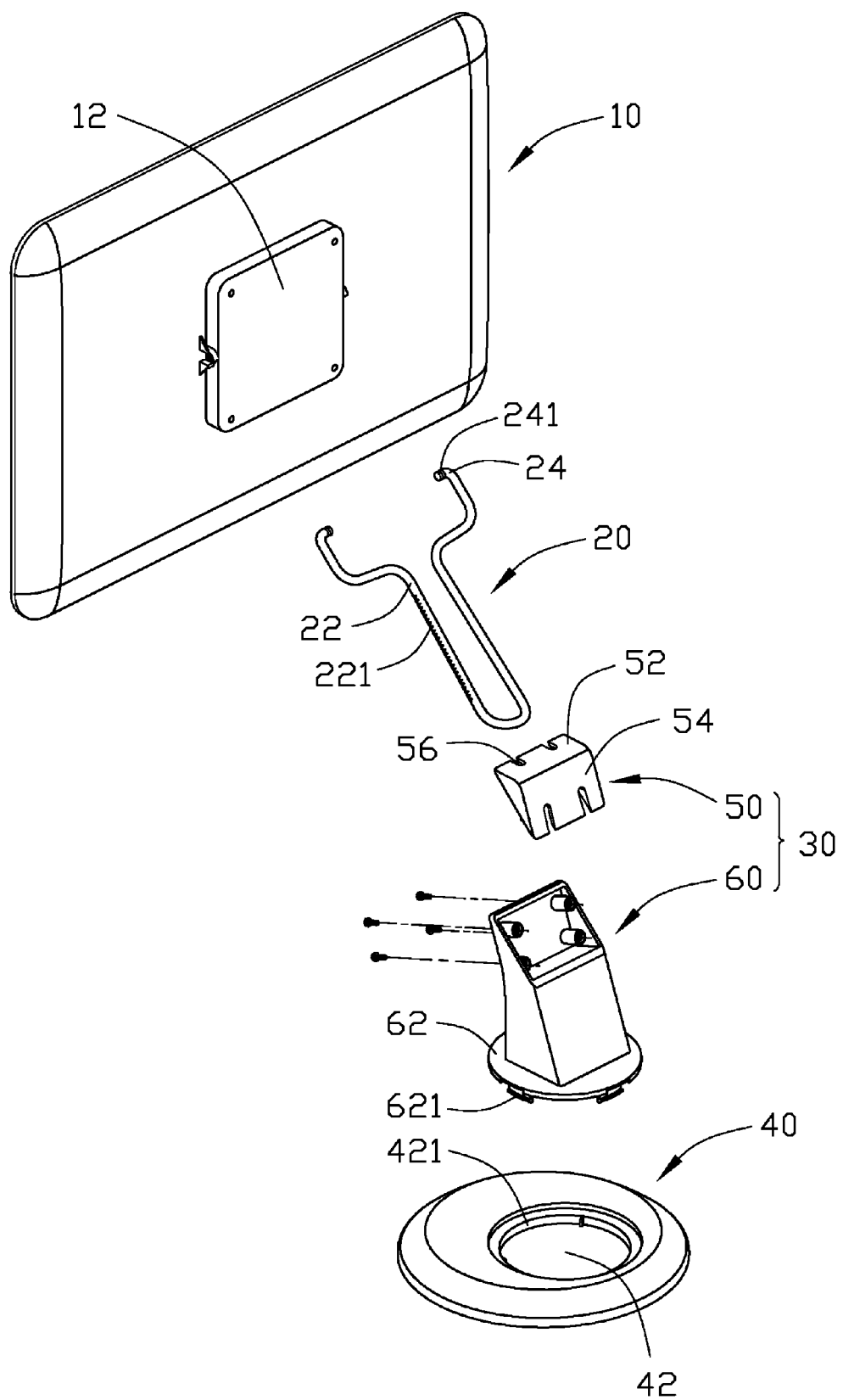
FIG. 1 is an exploded, isometric view of an embodiment of a display structure, the display structure including a display unit, a connecting member, a stand, and a base, the stand including a cover portion and a main portion.

Referring to FIG. 1, an embodiment of a display structure includes a display unit 10, a connecting member 20, a stand 30, and a base 40. The stand 30 includes a cover portion 50 and a main portion 60.

Figure 2:
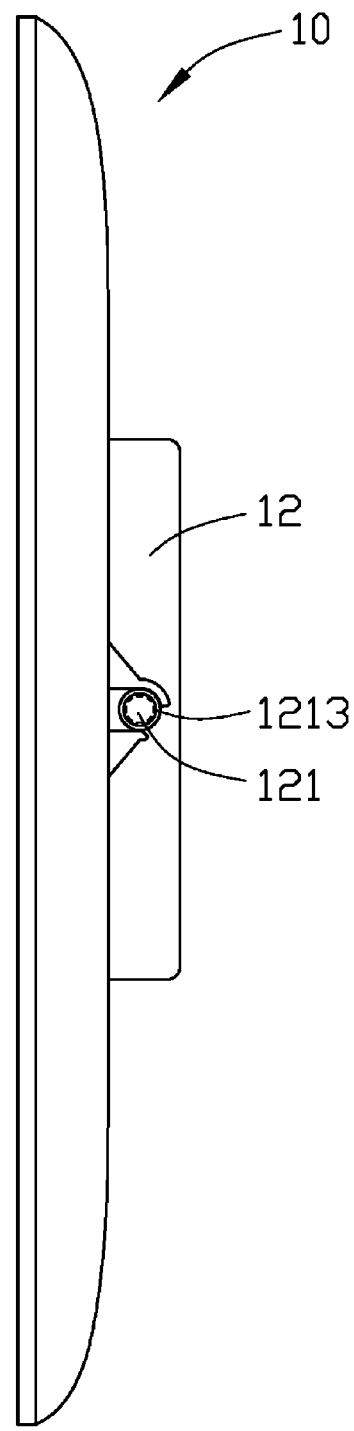
FIG. 2 is a side view of the display unit of FIG. 1.

Referring also to FIG. 2, the display unit 10 includes a protruded portion 12 at a back side thereof. A pair of pivot holes 121 is defined in two sides of the protruded block 12. A plurality of resisting protrusions 1213 is equally positioned around each of the pivot holes 121.

The connecting member 20 is symmetrically shaped and includes a pair of arm sections 22 and a pair of distal ends 24 engaging in the pivot holes 121 of the display unit 10. At least one of the arm sections 22 defines a plurality of recessed portions 221 therein. Each distal end 24 of the connecting member 20 has an external helical thread 241 engaging with the resisting protrusions 1213 around one of the pivot holes 121. The connecting member 20 may be wire like and elastic.

Figure 3:
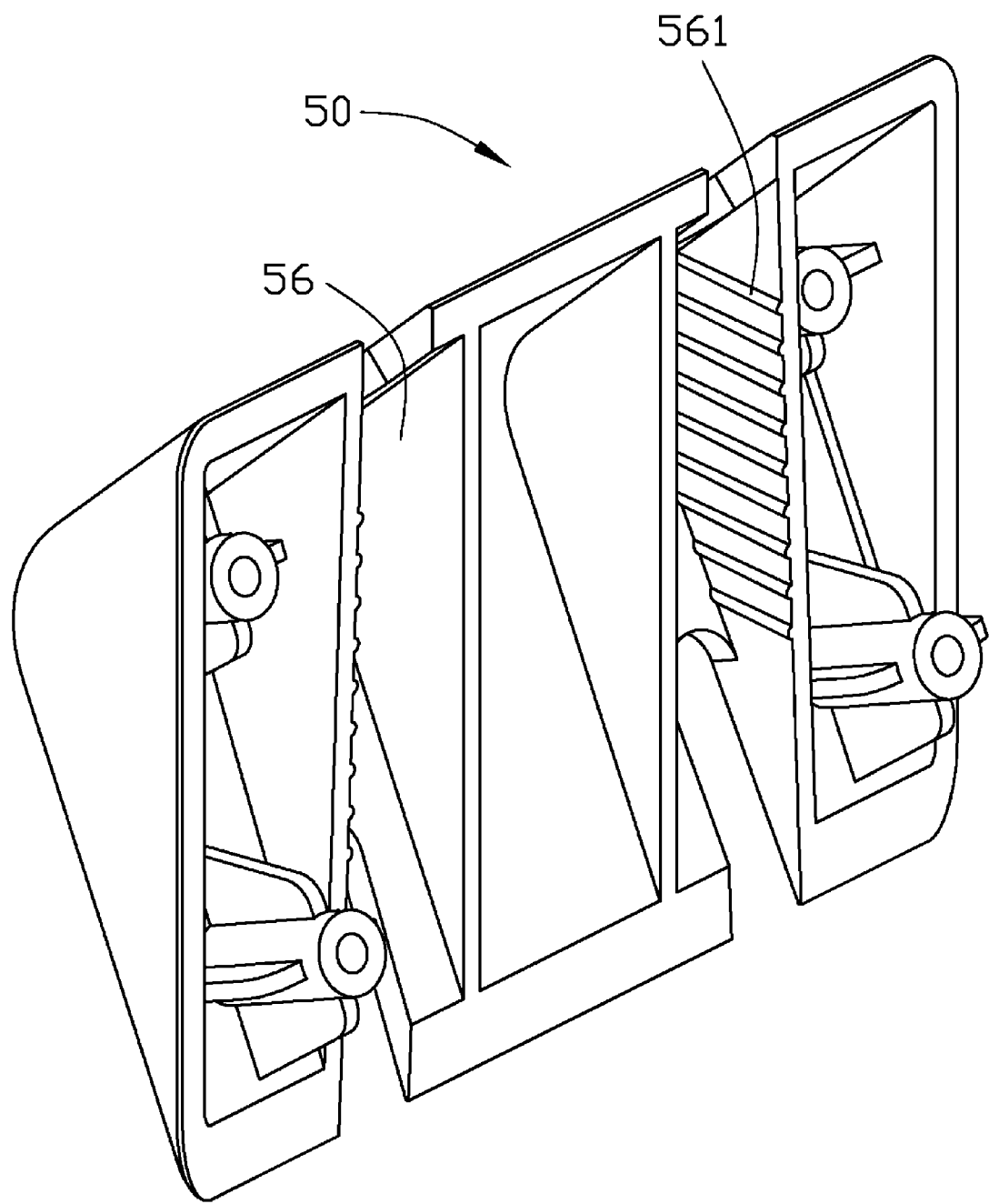
FIG. 3 is an isometric view of the cover portion of FIG. 1.

Referring to FIG. 3, a cross section of the cover portion 50 is substantially triangular. The cover portion 50 includes a top surface 52 and a side surface 54 substantially perpendicularly connecting with the top surface 54. A pair of inclined slots 56 is defined in the cover portion 50 and extends through the top surface 52 and the side surface 54. A plurality of resisting posts 561 is formed at the slots 56 corresponding to the recessed portions 221 of the connecting member 20.

The main portion 60 of the stand 30 includes a substantially circular bottom panel 62. A plurality of hooks 621 extends downwardly from a substantially circular edge of the bottom panel 62. The base 40 defines a substantially circular opening 42 therein to receive the substantially circular bottom panel 62 of the main portion 60. A substantially circular slideway 421 protrudes downwardly around the substantially circular opening 42.

Figure 4:
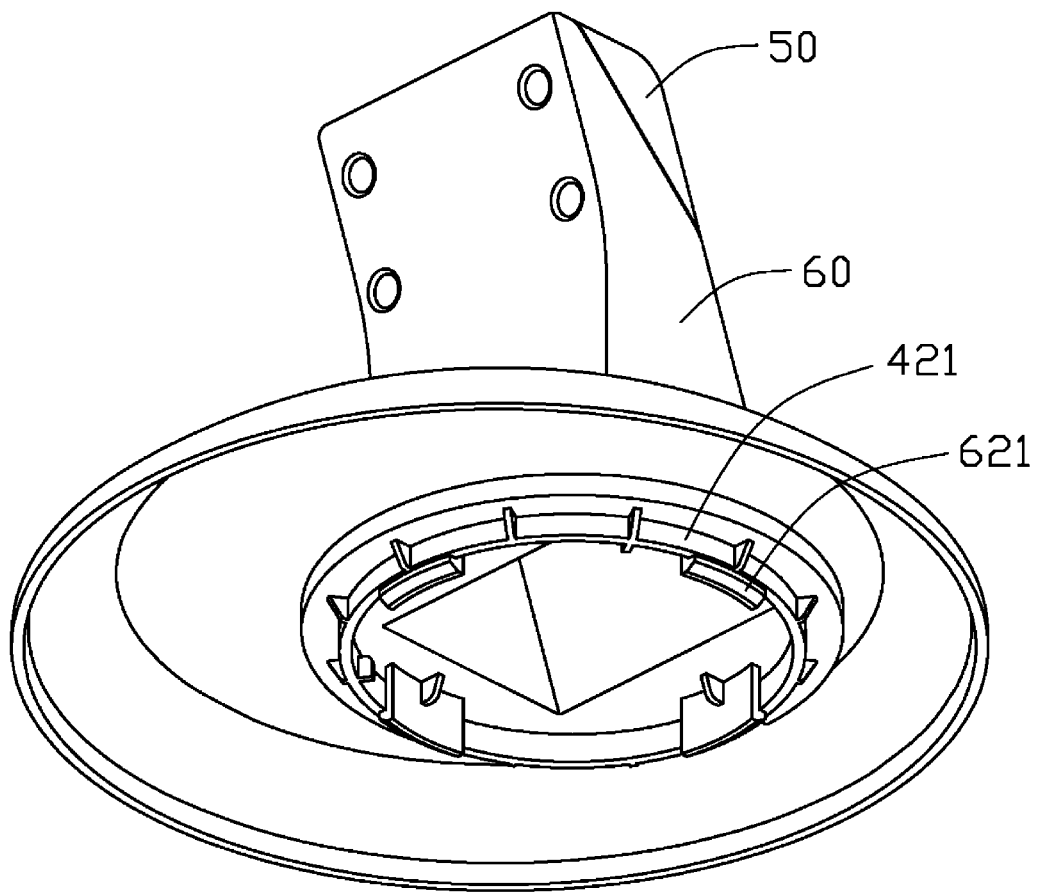
FIG. 4 is an assembled isometric view of the stand and the base of FIG. 1.
Figure 5:
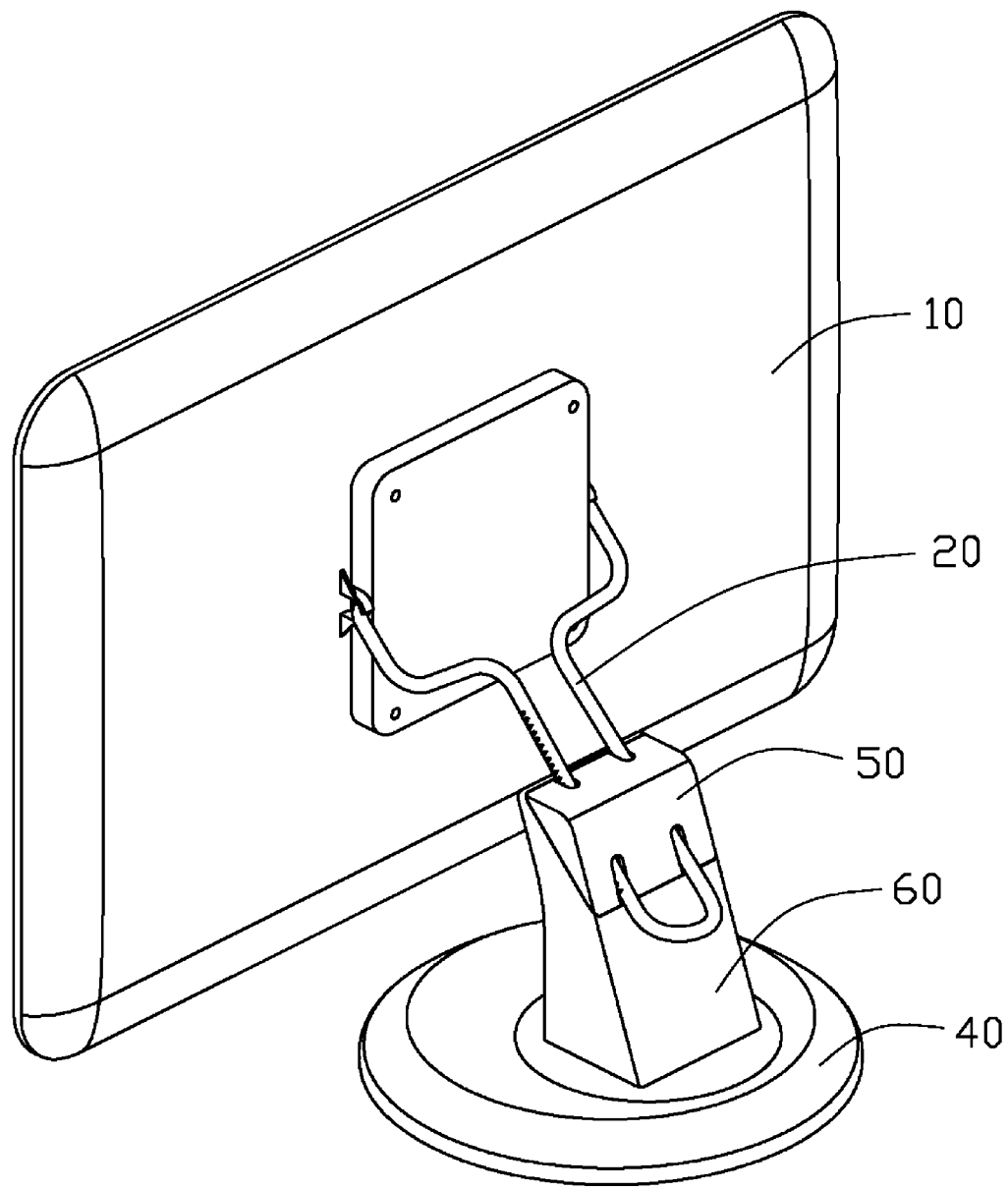
FIG. 5 is an assembled isometric view of the display structure of FIG. 1.

Referring to FIGS. 4 and 5, the arm sections 22 of the connecting member 20 engage in the slots 56 of the cover portion 50. The cover portion 50 is secured to the main portion 40. The bottom panel 62 of the main portion 60 is engaged in the opening 42 of the base 40. The hook 621 of the main portion 60 engages with the slideway 421 of the base 40 and slidable along the slideway 421. The distal ends 24 of the connecting member 20 engage in the pivot holes 121 of the display unit 10.

The display unit 10 can then be rotated to a desired angle about a horizontal axis when the display unit 10 is rotated relative to the connecting member 20 and a vertical axis when the stand 30 is rotated relative to the base 40. The helical threads 241 of the distal ends 24 of the connecting member 20 engage with the resisting protrusions 1213 to fix the display unit 10 at the desired angle. The arm sections 22 of the connecting member 20 are slidable along the inclined slots 56 of the cover portion 50 of the stand 30 to adjust a height of the display unit 10. The resisting posts 561 at the slots 56 of the cover portion 50 engage with the recessed portions 221 of the connecting member to fix the display unit 10 at a desired height.

While the present disclosure has been illustrated by the description of embodiments thereof, and while the embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A display structure, comprising:
   a base;
   a stand pivotably attached to the base and rotatable along a first axis;
   an elastic connecting member comprising a pair of arm sections slidably engaged with the stand; and
   a display unit pivotably engaged with ends of the connecting member and rotatable along a second axis substantially perpendicular to the first axis.

2. The display structure of claim 1, wherein the stand comprises a main portion and a cover portion attached on the main portion; a pair of inclined slots is defined in the cover portion to engage with the arm sections of the connecting member.

3. The display structure of claim 2, wherein at least one of the arm sections of the connecting member defines a plurality of recessed portions therein, the cover portion comprises a plurality of resisting posts at the slots engaging with the recessed portions to fix the connecting member at a desired height.

4. The display structure of claim 2, wherein a cross section of the cover portion is substantially triangular; the cover portion comprises a top surface and a side surface; the slots extend through the top surface and the side surface.

5. The display structure of claim 2, wherein the main portion of the stand comprises a substantially circular bottom; the base defines a substantially circular opening therein for receiving the substantially circular bottom.

6. The display structure of claim 5, wherein the main portion further comprises at least one hook extending downwardly from an edge of the circular bottom, the base comprise a circular slideway protruding downwardly around the circular opening, the at least one hook engages with the slideway and is slidable along the slideway.

7. The display structure of claim 1, wherein the display unit comprises a protruded block at a backside thereof, the protruded block defines a pair of pivot holes therein engaging with the ends of the connecting member and comprises a plurality of resisting protrusions positioned around the pivot holes; the ends of the connecting member comprises helical threads engaging with the resisting protrusions.

8. A display structure, comprising:
    a display unit;
    a connecting member pivotably attached to the display unit to rotate the display unit along a first axis, the connecting member resiliently expandable along the first axis;
    a stand is slidably attached to the connecting member to adjust a height of the display unit, the connecting member slidable along a slanting direction; and
    a base pivotably attached to the stand to rotate the display unit along a second axis substantially perpendicular to the first axis.

9. The display structure of claim 8, wherein the stand comprises a main portion and a cover portion attached on the main portion, a pair of slanted slots is defined in the cover portion to slidably engage with the connecting member.

10. The display structure of claim 9, wherein the connecting member is substantially symmetrically shaped and comprises a pair of arm sections engaging with the slots of the stand.

11. The display structure of claim 10, wherein at least one of the arm sections of the connecting member defines a plurality of recessed portions therein, the cover portion comprises a plurality of resisting posts at the slots engaging with the recessed portions to fix the connecting member at a desired height.

12. The display structure of claim 9, wherein the main portion of the stand comprises a substantially circular bottom, the base defines a substantially circular opening therein for receiving the substantially circular bottom.

13. The display structure of claim 12, wherein the main portion further comprises at least one hook extending downwardly from an edge of the substantially circular bottom, the base comprises a substantially circular slideway protruding downwardly around the substantially circular opening, the at least one hook engages with the slideway and is slidable along the slideway.

14. The display structure of claim 8, wherein the display unit comprises a protruded block at a backside thereof, the protruded block defines a pair of pivot holes therein engaging with the ends of the connecting member.

15. The display structure of claim 14, wherein the protruded block comprises a plurality of resisting protrusions positioned around the pivot holes; the ends of the connecting member comprises helical threads engaging with the resisting protrusions.

* * * * *